United States Patent
Lindstam

(10) Patent No.: US 11,969,676 B2
(45) Date of Patent: Apr. 30, 2024

(54) REFINER DEVICE FOR REFINING OF A LIQUID

(71) Applicant: COT—Clean Oil Technology AB, Ljungby (SE)

(72) Inventor: Magnus Lindstam, Ljungby (SE)

(73) Assignee: COT—Clean Oil Technology AB, Ljungby (SE)

( * ) Notice: Subject to any disclaimer, the term of this patent is extended or adjusted under 35 U.S.C. 154(b) by 174 days.

(21) Appl. No.: 17/769,500

(22) PCT Filed: Dec. 15, 2020

(86) PCT No.: PCT/EP2020/086240
§ 371 (c)(1),
(2) Date: Apr. 15, 2022

(87) PCT Pub. No.: WO2021/213694
PCT Pub. Date: Oct. 28, 2021

(65) Prior Publication Data
US 2023/0330558 A1    Oct. 19, 2023

(30) Foreign Application Priority Data
Apr. 24, 2020  (SE) .................................. 2050467-6

(51) Int. Cl.
*B01D 3/34* (2006.01)
*B01D 1/00* (2006.01)
(Continued)

(52) U.S. Cl.
CPC ............ *B01D 3/346* (2013.01); *B01D 1/0011* (2013.01); *B01D 1/22* (2013.01); *F01M 1/10* (2013.01);
(Continued)

(58) Field of Classification Search
CPC ......... B01D 1/0011; B01D 1/22; B01D 3/346
See application file for complete search history.

(56) References Cited

U.S. PATENT DOCUMENTS 2,307,954 A    1/1943  Radke
2,785,109 A    3/1957  Schwalge
(Continued)

FOREIGN PATENT DOCUMENTS

DE          3739929 A1      6/1989
WO    WO-2004/045757 A2    6/2004
(Continued)

OTHER PUBLICATIONS

Search Report, Swedish Application No. 2050467-6, dated Dec. 8, 2020.
(Continued)

*Primary Examiner* — Jonathan Miller
(74) *Attorney, Agent, or Firm* — MARSHALL, GERSTEIN & BORUN LLP

(57) ABSTRACT

A refiner device for refining of a liquid, wherein the refiner device includes a housing provided with a liquid inlet for unrefined oil or fuel, a liquid outlet for refined oil or fuel, an air inlet for supplying a flow of air into the housing, and an air outlet for discharging air and contaminants removed from the liquid. The refiner device further includes a liquid receiving plate arranged inside the housing, the refiner device arranged such that when liquid has passed through the liquid inlet during operation of the device, the liquid is contacted with an upper surface of the liquid receiving plate before it reaches the liquid outlet, and at least one heating element arranged to directly or indirectly heat the liquid while the liquid is in contact with the liquid receiving plate. The refiner device further includes a hollow air-guiding member arranged at the liquid receiving plate.

13 Claims, 4 Drawing Sheets

(51) Int. Cl.
*B01D 1/22* (2006.01)
*F01M 1/10* (2006.01)
*F01M 5/00* (2006.01)
*F02M 37/30* (2019.01)
*F02M 37/38* (2019.01)
*F16N 39/00* (2006.01)
*F16N 39/04* (2006.01)
*F24H 1/00* (2022.01)

(52) U.S. Cl.
CPC ............ *F01M 5/001* (2013.01); *F02M 37/30* (2019.01); *F02M 37/38* (2019.01); *F16N 39/005* (2013.01); *F16N 39/04* (2013.01); *F24H 1/0018* (2013.01); F01M 2001/1021 (2013.01); F24H 2250/04 (2013.01)

(56) References Cited

U.S. PATENT DOCUMENTS

| | | | |
|---|---|---|---|
| 3,771,656 | A | 11/1973 | Leaming |
| 8,318,023 | B2* | 11/2012 | Mordukhovich .... B01D 63/082 95/52 |
| 8,377,263 | B2* | 2/2013 | Soderlund ............. F01M 5/001 196/115 |
| 10,981,081 | B2* | 4/2021 | Ahan ....................... B01D 3/32 |
| 2012/0279931 | A1* | 11/2012 | Geiger ................. B01D 35/185 210/167.07 |
| 2013/0341259 | A1 | 12/2013 | Harris et al. |
| 2019/0309902 | A1 | 10/2019 | Ostgaard |

FOREIGN PATENT DOCUMENTS

| | | |
|---|---|---|
| WO | WO-2007/043928 A1 | 4/2007 |
| WO | WO-2012097279 A1 | 7/2012 |
| WO | WO-2017/093470 A1 | 6/2017 |

OTHER PUBLICATIONS

International Preliminary Report on Patentability, International Application No. PCT/EP2020/086240, dated Dec. 20, 2021.
First Examination Report, Indian Patent Application No. 202247017135, dated Jan. 20, 2023.

* cited by examiner

REFINER DEVICE FOR REFINING OF A LIQUID

CROSS REFERENCE TO RELATED APPLICATION

The present application claims priority to International Application No. PCT/EP2020/086240 which claims priority from Application 2050467-6 filed on Apr. 24, 2020 in Sweden. The entire contents of these applications are incorporated herein by reference in their entirety.

TECHNICAL FIELD

This invention relates to a refiner device for refining of a liquid, such as oil or fuel, according to the preamble of claim 1.

BACKGROUND OF THE INVENTION

Operation of internal combustion engines and hydraulic-mechanical devices involves the use of lubricating oil and hydraulic oil, respectively. Further, internal combustion engines are usually powered by energy-dense liquid fuel such as e.g. mineral fuel, petrol, diesel oil, i.e. liquids derived from fossil fuels, and/or bio fuels. Such oil and fuel liquids get contaminated and needs to be refined.

When the internal combustion engine is operated, the lubricating oil becomes contaminated with non-combusted fuel, water, cooling agents such as glycol and/or substances from the fuel combustion. Hydraulic oil is generally not subject to any combustion process but becomes typically contaminated in a similar way as lubrication oil. In these types of applications, the oil absorbs water from air humidity and condensation in the tank, or from water penetrating the system at change-overs or when cleaning. Thus, there is a desire to refine or clean the oil from unwanted substances without replacing the oil in the device.

In some oil cleaning devices the device may include a particle filter that initially cleans the oil from particles and a liquid separation part intended for separating liquid in the form of water and fuel from the particle free oil. The liquid separation part can be provided in several different ways, e.g. as a substantially dome shaped heating plate. The heat plate may typically be shaped and arranged so that the oil remains on the heating plate for a certain period of time. In this manner, the complete oil film is brought to a temperature, by the heating plate, where the liquid can evaporate from the oil which remains on the plate.

U.S. Pat. No. 8,377,263B2 discloses one example of a device for regenerating oil, in which the device comprises a heat source, a support substrate and a transportation device. This type of device is based on the principle of heating e.g. hydraulic oil within a period of time to ensure that an appropriate level of evaporation of water can occur at a high flow rate. This device thus makes use of the fact that oil and water have different boiling temperatures.

Another problem relates to the fact that the outdoor temperature often differs in different climates and in different parts of the world, which affects the temperature of the oil entering the liquid separation part. Cold conditions give colder oil and further energy is therefore required in order for the oil to reach the right temperature. Warm conditions, on the other hand, give warmer oil requiring the heat from the heat plate to be regulated to compensate the heat increase in order for the oil not to reach too high temperature. A properly working regulating arrangement for the heat plate is thus necessary for making the system work properly. Such a regulating arrangement comprises thermostats and other regulators comprising moving parts which in this context is a possible cause for malfunction, causing limited useful life and often undesired high oil temperatures. Such a regulating arrangement is also expensive and hard to install.

WO2017093470A1 discloses an oil refinery device where oil or fuel is fed to a heated plate arranged in a housing and where air is fed to and from the housing so as to transport away contaminates evaporated from the oil or fuel. The plate is heated by point heat sources.

Although the device of WO2017093470A1 appears to provide for relatively efficient refining and easy installation and use in existing systems such as industrial applications, hydraulic applications or the like, there is still a need for improvements.

SUMMARY OF THE INVENTION

An object of this invention is to provide a refinery device that exhibit an improved refinery efficiency compared to conventional refinery devices, but that still provides for easy installation and use in existing systems. This object is achieved by the device defined by the technical features contained in claim 1. The dependent claims contain advantageous embodiments, further developments and variants of the invention.

The invention concerns a refiner device for refining of a liquid, such as oil or fuel, wherein the refiner device comprises a housing provided with a liquid inlet for unrefined oil or fuel, a liquid outlet for refined oil or fuel, an air inlet for supplying a flow of air into the housing, and an air outlet for discharging air and contaminants removed from the liquid. The refiner device further comprises a liquid receiving plate arranged inside the housing, wherein the refiner device is arranged such that when liquid has passed through the liquid inlet during operation of the device, the liquid is contacted with an upper side of the liquid receiving plate before it reaches the liquid outlet. The refiner device further comprises at least one heating element arranged to directly or indirectly heat the liquid while the liquid is in contact with the liquid receiving plate.

The refiner device may be of the type exemplified in, for instance, WO2017093470A1 where unrefined oil or fuel liquid is deposited onto and allowed to flow over a substantially horizontal, or at least not too inclined, heated plate or similar before it flows further down to an outlet. The expression "the liquid is contacted with an upper side of the liquid receiving plate" thus relates to the situation when the device has been properly oriented for being operated.

The invention is characterized in that the refiner device comprises a hollow air-guiding member arranged at the liquid receiving plate, wherein the hollow air-guiding member has an open side facing the upper surface of the liquid receiving plate, wherein the air inlet is located outside of the hollow air-guiding member, wherein the air outlet is located inside of the hollow air-guiding member, wherein at least one air passage into the hollow air-guiding member is arranged at the liquid receiving plate so as to, when air is fed through the housing from the air inlet to the air outlet, force air to flow along at least a part of the liquid receiving plate when passing through the air passage and/or when flowing further into the hollow air-guiding member towards the air outlet.

The at least one air passage thus provides a flow communication between the air outlet inside the hollow air-guiding member and the air inlet outside of said member.

And the air passage is arranged in association with the liquid receiving plate so as to force the air flow closer to the plate.

An advantageous effect of such a design is that the air flow, preferably the entire air flow, is forced to pass closer to the heated liquid located on the liquid receiving plate on its way towards the air outlet. This makes the transfer of (evaporated) contaminants from the liquid to the air much more efficient compared to e.g. the device of WO2017093470A1 where the air flow is not forced to pass along the plate but instead can take almost any path inside the housing from the air inlet to the air outlet and thus might pass through the housing without coming into contact with the heated liquid.

In an embodiment the device is arranged so that liquid that enters the housing via the liquid inlet during operation of the device is deposited onto a first point of the liquid receiving plate and so that the deposited liquid flows upon the liquid receiving plate in a direction towards a second point of the liquid receiving plate, and wherein the at least one air passage is arranged at the second point of the liquid receiving plate so as to, during operation of the device, force air to flow in a general direction towards the first point of the liquid receiving plate, i.e. in a direction generally opposite to that of the liquid flow.

A main effect of such an embodiment is that a counter-current flow is obtained at the liquid receiving plate during operation of the device in that the liquid flows on the plate in one direction and the air flows above the plate in the opposite direction. Such a counter-current flow further increases the transfer of contaminants from the liquid to the air flow and thus further increases the refining efficiency.

A counter-current flow of this type can be obtained by directing the incoming liquid towards a certain point of the liquid receiving plate, adapting the plate so that the liquid flows from that point in a certain direction, such as towards an edge of the plate, and locating the air passage leading into the hollow air-guiding member so that the air flows in the opposite direction in relation to the liquid.

In an embodiment, the first point (at which incoming unrefined liquid is deposited onto the liquid receiving plate) is a central point of the liquid receiving plate, wherein the device is arranged so that the liquid deposited onto the first, central point flows radially outwards from the first, central point towards a perimeter of the liquid receiving plate, wherein the second point is located at said perimeter. The air passage leading into the hollow air-guiding member may in such a case have the form of an opening that extends along the perimeter edge of the plate (or have the form of a plurality of openings distributed along said perimeter edge). If the liquid receiving plate is a circular disc the air passage may thus have the form of an annular opening (or have the form of a plurality of openings distributed along the circumference of the circular plate).

In other embodiments the liquid receiving plate may have another shape than a circular disc, and the air passage(s) may have another design. In one embodiment the liquid receiving plate may have a rectangular shape, in which case the liquid may be deposited at a first end of the plate and the air passage may be arranged at a second opposite end of the plate (where the device is arranged so that the liquid flows from the first to the second end of the plate during operation).

In an embodiment the hollow air-guiding member comprises a funnel shaped element having a wide side and an opposite narrow side, wherein the funnel shaped element is arranged at the liquid receiving plate with its wide side facing the liquid receiving plate. Such a funnel shaped air-guiding member is well adapted for a liquid receiving plate have the shape of a circular disc.

In an embodiment the at least one air passage is distributed around a perimeter of the liquid receiving plate. As mentioned above, this means that the air passage may be a single opening that extends along the perimeter or a plurality of openings distributed along the perimeter. Such a plurality of openings may or may not be evenly distributed along the perimeter depending on the design of the liquid receiving plate.

In an embodiment the liquid receiving plate and the hollow air-guiding member are separate components arranged at a distance from each other, wherein said distance forms the at least one air passage. In such a case the plate and the air-guiding member may or may not be connected directly to each other.

In an embodiment the liquid inlet is arranged inside of the hollow air-guiding member. This facilitates depositing the liquid properly onto the liquid receiving plate. The term "liquid inlet" thus here refers to the position where the liquid is introduced into the housing of the device, i.e. "the outlet of the liquid inlet".

In an embodiment the at least one heating element is a PTC ceramic element. PTC elements (positive thermal coefficient of resistance) are suitable for heating as they can be controlled properly. It is important to keep the temperature within a set interval during operation of the device since a too low temperature leads to a poor refining efficiency and since a too high temperature may deteriorate the oil or fuel to be refined. Which temperature to be used depends on the particular application. PTC ceramic heating elements are well known as such.

In an embodiment the at least one heating element is arranged to heat the liquid receiving plate. The heating element(s) thus heat(s) the liquid indirectly, via the plate.

In an embodiment the device comprises a plurality of distributed heating elements. This provides for an even distribution of the temperature, in particular where the heating elements heat the liquid receiving plate (that in turn heats the liquid).

In an embodiment the device comprises an air flow control system configured to control supply and/or quality of the air fed to the air inlet during operation of the device. In most applications it is important to control the mass flow rate of the air properly. The control system may also control e.g. pre-drying of the air.

In an embodiment the liquid inlet is arranged in an upper part of the housing. Preferably, the liquid outlet is arranged in a lower part of the housing. The liquid may thus flow through the device downwardly using only gravity as the driving force.

BRIEF DESCRIPTION OF THE DRAWINGS

In the description of the invention given below reference is made to the following figure, in which.

DETAILED DESCRIPTION OF THE DRAWINGS

Figure 1:
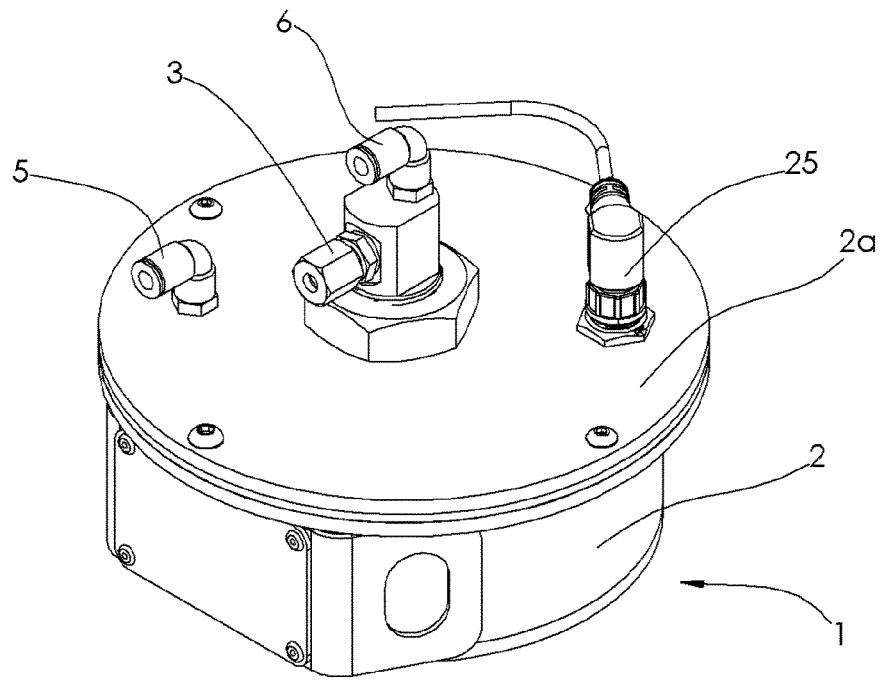
FIG. 1 shows, in a perspective view, an example embodiment of a refiner device according to this disclosure.
Figure 2:
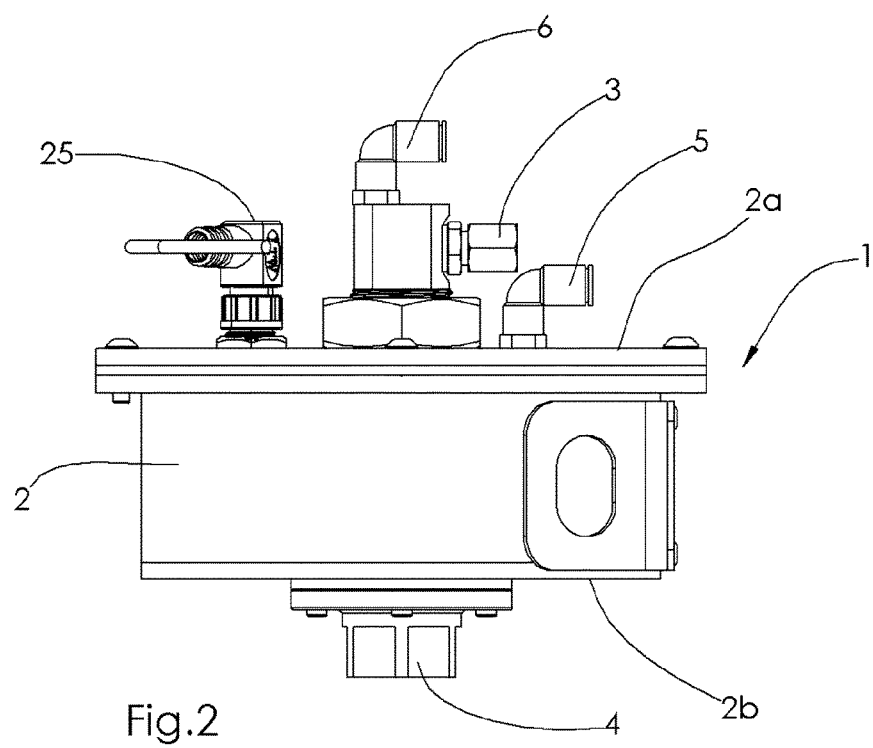
FIG. 2 shows, in a side view, the embodiment of FIG. 1.

An example embodiment of a refiner device 1 for refining of a liquid, such as oil or fuel, will now be described with reference to FIGS. 1-5.

The refiner device 1 comprises a housing 2 provided with a liquid inlet 3 for unrefined oil or fuel, a liquid outlet 4 for refined oil or fuel, an air inlet 5 for supplying a flow of air into the housing 2, and an air outlet 6 for discharging air and contaminants removed from the liquid. The liquid outlet 4 is arranged on a lower side 2b of the housing 2, whereas the air outlet 6 and the two inlets 3, 5 are arranged on an upper side 2a of the housing 2. An electric connection 25 for supplying electric power to heating elements 9 arranged inside the housing 2 is also provided on the upper side 2a of the housing 2. The electric connection 25 is also arranged to provide for control of the heating elements 9.

The refiner device 1 further comprises a liquid receiving plate 7 arranged inside the housing 2. The refiner device 1 is arranged such that when liquid (solid arrows 8 in FIG. 3) has passed through the liquid inlet 3 during operation of the device 1, the liquid 8 is contacted with an upper side 7a (see FIGS. 4 and 5) of the liquid receiving plate 7 before it flows over an circumferential edge of the liquid receiving plate 7 downwards a bottom of the housing 2 and reaches the liquid outlet 4. The liquid receiving plate 7 has in this example the general shape of a circular disc.

The device 1 is arranged so that liquid that enters the housing 2 via the liquid inlet 3 during operation of the device 1 is deposited onto a first point 7b of the liquid receiving plate 7. In this case this first point 7b is a central point of the circular liquid receiving plate 7. A dome shaped part is arranged at this central point 7b. Liquid deposited onto this first, central point 7b will then flow upon the liquid receiving plate 7 radially outwards in a direction towards a second point of the liquid receiving plate 7, wherein this second point in this example is a perimeter or edge of the liquid receiving plate 7. An air passage 11 is arranged along the edge of the liquid receiving plate 7 (see further explanation below).

The refiner device 1 further comprises a plurality of heating elements in the form of controllable PTC ceramic elements 9 arranged under and adjacent to an outer, lower section of the liquid receiving plate 7. The heating elements 9 are arranged to heat the liquid receiving plate 7 and thus to indirectly heat the liquid 8 while the liquid is in contact with, i.e. flows over, the liquid receiving plate 7.

The refiner device 1 further comprises a hollow air-guiding member 10 arranged at the liquid receiving plate 7. In this example the hollow air-guiding member has the general form of a funnel shaped element 10 having a wide, open, lower side 10a and an opposite narrow, upper side 10b (see FIG. 4). The funnel shaped element 10 is arranged at the liquid receiving plate 7 with its wide, open side 10a facing downwards towards the upper surface 7a of the liquid receiving plate 7. The hollow air-guiding member/funnel shaped element 10 is in this example circular and the size and shape of the wide, open side 10a generally corresponds to the size and shape of the liquid receiving plate 7.

A component 12 comprising ducts forming part of the liquid inlet 3 and the air outlet 6 is arranged at the narrow, upper side 10b of the funnel shaped element 10.

Figure 3:
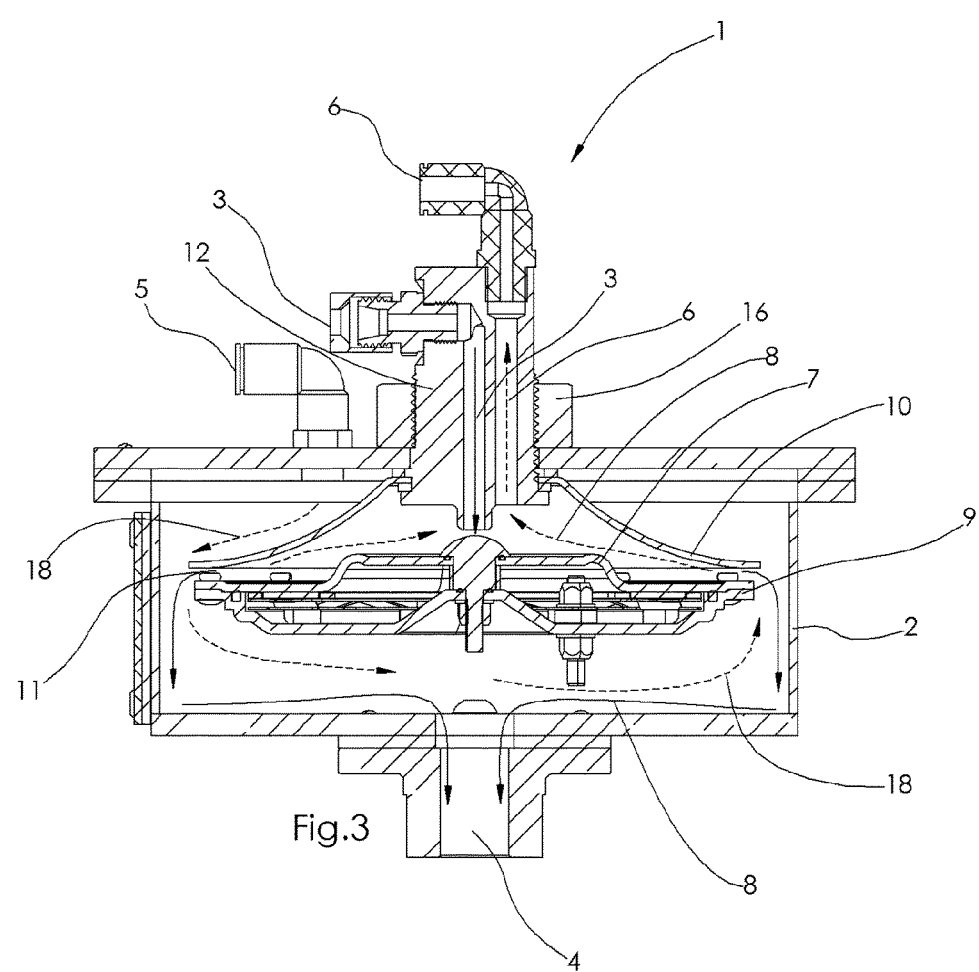
FIG. 3 shows, in a sectional view, the embodiment of FIG. 1.

As shown in FIG. 3, the air inlet 5 is located outside of the hollow air-guiding member/funnel shaped element 10, i.e. the air fed to the device 1 enters the housing 2 outside of the hollow air-guiding member/funnel shaped element 10. As further shown in FIG. 3, the air outlet 6 is located inside of the hollow air-guiding member/funnel shaped element 10 (in the component 12), which means that air (and contaminants) that is fed away from the device 1 exits the housing 2 inside of the hollow air-guiding member/funnel shaped element 10.

Besides the air outlet 6, also the liquid inlet 3 is arranged inside of the hollow air-guiding member/funnel shaped element 10 (in the component 12), i.e. unrefined liquid that is fed to the device 1 enters the housing 2 inside of the hollow air-guiding member/funnel shaped element 10.

The air passage 11 mentioned above is arranged at the liquid receiving plate 7 and is arranged to allow air to flow into the hollow air-guiding member/funnel shaped element 10 is. In this example the air passage 11 has the form of an annular opening extending between the outer perimeters of the lower, wide side 10a of the funnel shaped element 10 and of the (upper surface 7a of the) liquid receiving plate 7. The liquid receiving plate 7 and the hollow air-guiding member/funnel shaped element 10 are here separate components arranged at a distance from each other, and this distance forms the annular air passage 11.

Figure 4:
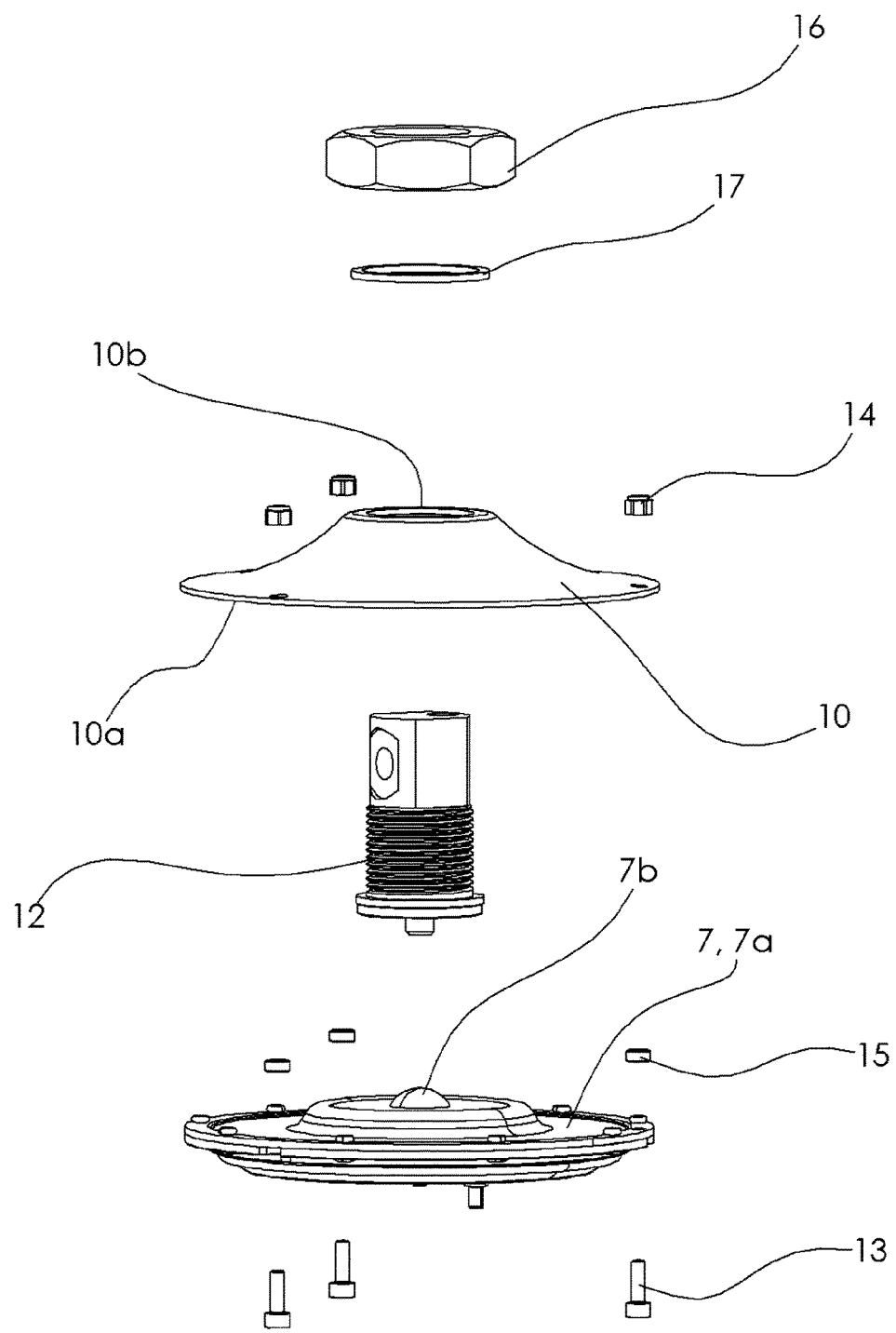
FIG. 4 shows, in an exploded view, some parts of the embodiment of FIG. 1.
Figure 5:
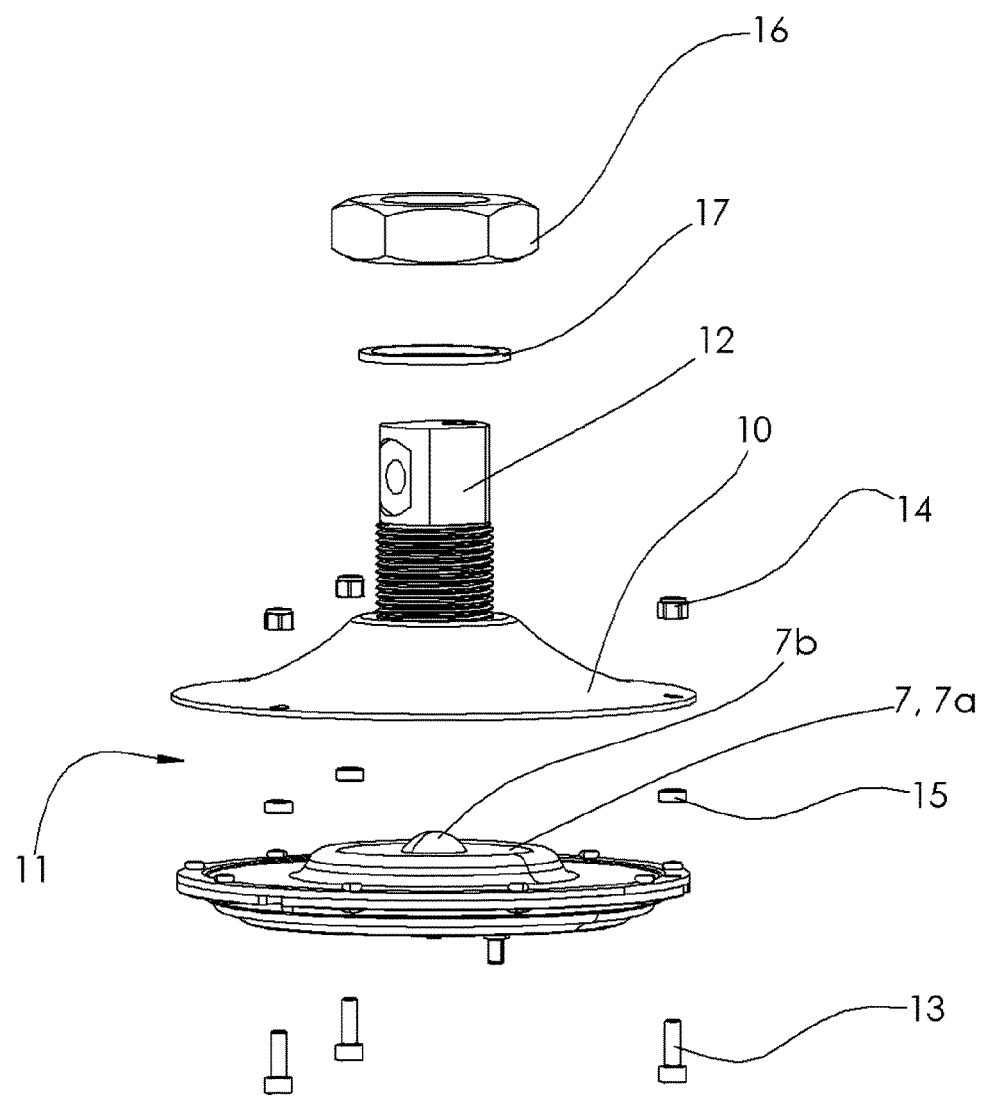
FIG. 5 shows the parts of FIG. 4 in another exploded view.

As shown in FIGS. 3-5, the liquid receiving plate 7 and the funnel shaped element 10 are connected to each other by means of screws 13 and nuts 14. Distance elements 15 are provided between the liquid receiving plate 7 and the funnel shaped element 10 so as to create the annular air passage 11.

The component 12 fits into an opening in the narrow side 10b of the funnel shaped element 10 has a flange at its lower side that fits below a corresponding flange of the funnel shaped element 10 so as to hold the funnel shaped element 10 (and the liquid receiving plate 7 connected thereto) in place. The lower side of the component 12 closes the narrow side 10b of the funnel shaped element 10. An upper portion of the component 12 protrudes through an opening in the upper side 2a of the housing 2 and is connected to the upper side 2a of the housing 2 by means of a nut 16 (and a washer 17) arranged on the outer, upper side 2a of the housing 2, wherein the nut 16 is threaded onto threads arranged on the component 12.

When air is fed through the housing 2 from the air inlet 5 to the air outlet 6, the air (see dashed arrows 18 in FIG. 3) is forced to flow through the annular air passage 11 radially inwards along at least a part of the liquid receiving plate 7 when passing through the air passage 11 and flowing further into the hollow air-guiding member 10 towards the air outlet 6. Since the oil or fuel liquid flows in the opposite radial direction over the liquid receiving plate 7 a counter-current flow is created between the (heated) liquid flow 8 and the air flow 18. Besides that the air is forced to flow close the surface of the liquid, the air is thus forced to create a counter-current flow. Together this provides for a very efficient transfer of (evaporated) contaminants from the liquid to the air and thus for a very efficient refining of the liquid.

The refiner device 1 further comprises an air flow control system (not shown) configured to control supply (mass flow rate) of the air fed to the air inlet 5 during operation of the device 1. The air flow control system also comprises a drying unit for drying air fed to the device 1 in order to further increase transfer of water (vapour) from the liquid to the air.

The invention is not limited by the embodiments described above but can be modified in various ways within the scope of the claims. For instance, the liquid receiving plate 7 may have another shape than a circular disc and the incoming liquid does not necessarily have to be deposited onto a centrally located point of the liquid receiving plate 7. Moreover, the hollow air guiding member 10 does not necessarily have to comprise a funnel shaped element but can have another shape.

The invention claimed is:

1. A refiner device for refining of a liquid, wherein the refiner device comprises:
   a housing provided with a liquid inlet for unrefined oil or fuel, a liquid outlet for refined oil or fuel, an air inlet for supplying a flow of air into the housing, and an air outlet for discharging air and contaminants removed from the liquid,
   a liquid receiving plate arranged inside the housing,
   wherein when the liquid has passed through the liquid inlet during operation of the refiner device, the liquid contacts an upper surface of the liquid receiving plate before the liquid reaches the liquid outlet,
   at least one heating element arranged to directly or indirectly heat the liquid while the liquid is in contact with the liquid receiving plate, and
   a hollow air-guiding member arranged at the liquid receiving plate,
   wherein the hollow air-guiding member has an open side facing the upper surface of the liquid receiving plate,
   wherein the air inlet is located outside of the hollow air-guiding member,
   wherein the air outlet is located inside of the hollow air-guiding member,
   wherein at least one air passage into the hollow air-guiding member is arranged at the liquid receiving plate so as to, when air is fed through the housing from the air inlet to the air outlet, force air to flow along at least a part of the liquid receiving plate when passing through the air passage and/or when flowing further into the hollow air-guiding member towards the air outlet.

2. The refiner device according to claim 1, wherein when the liquid enters the housing via the liquid inlet during operation of the refiner device, the liquid is deposited onto a first point of the liquid receiving plate and so that the deposited liquid flows upon the liquid receiving plate in a direction towards a second point of the liquid receiving plate, and wherein the at least one air passage is arranged at the second point of the liquid receiving plate so as to, during operation of the refiner device, force air to flow in a general direction towards the first point of the liquid receiving plate.

3. The refiner device according to claim 2, wherein the first point is a central point of the liquid receiving plate, wherein during operation of the refiner device the liquid deposited onto the first, central point flows radially outwards from the first, central point towards a perimeter, and wherein the second point is located at said perimeter.

4. The refiner device according to claim 1, wherein the hollow air-guiding member comprises a funnel shaped element having a wide side and an opposite narrow side, and wherein the wide side of the funnel shaped element faces the liquid receiving plate.

5. The refiner device according to claim 1, wherein the at least one air passage is distributed around a perimeter of the liquid receiving plate.

6. The refiner device according to claim 1, wherein the liquid receiving plate and the hollow air-guiding member are separate components arranged at a distance from each other, wherein said distance forms the at least one air passage.

7. The refiner device according to claim 1, wherein the liquid inlet is arranged inside of the hollow air-guiding member.

8. The refiner device according to claim 1, wherein the at least one heating element is a PTC ceramic element.

9. The refiner device according to claim 1, wherein the at least one heating element is arranged to heat the liquid receiving plate.

10. The refiner device according to claim 1, wherein the at least one heating element comprises a plurality of distributed heating elements.

11. The refiner device according to claim 1, further comprising an air flow control system configured to control supply and/or quality of the air fed to the air inlet during operation of the device.

12. The refiner device according to claim 1, wherein the liquid inlet is arranged in an upper part of the housing.

13. The refiner device according to claim 1, wherein the liquid outlet is arranged in a lower part of the housing.

* * * * *